[19] United States Patent
Clark

[11] Patent Number: 4,588,992
[45] Date of Patent: May 13, 1986

[54] RADAR TRACKING SYSTEM AND DISPLAY

[76] Inventor: William E. Clark, 2035 Chisholm Trail, Las Cruces, N. Mex. 88005

[21] Appl. No.: 438,244

[22] Filed: Nov. 1, 1982

[51] Int. Cl.⁴ .............................................. G01S 7/26
[52] U.S. Cl. ...................................................... 343/10
[58] Field of Search .................. 343/5 R, 5 PD, 7.7, 343/10, 12 R, 12 A, 17

[56] References Cited

U.S. PATENT DOCUMENTS

| | | | |
|---|---|---|---|
| 1,149,122 | 8/1915 | Fuller | 250/213 R |
| 1,929,400 | 10/1933 | Schulte | 33/318 |
| 2,203,730 | 6/1940 | Johnson | 175/44 |
| 2,406,858 | 9/1946 | Shepherd et al. | 340/870.44 |
| 2,436,178 | 2/1948 | Rajchman | 33/16 |
| 2,557,967 | 6/1951 | Hudson et al. | 343/766 |
| 2,630,563 | 3/1953 | Haworth | 343/17 |
| 3,009,147 | 11/1961 | Fernandez | 33/1 M |
| 3,349,406 | 10/1967 | Perry et al. | 33/1 PT |
| 3,371,424 | 3/1968 | Sweet | 33/366 |
| 3,434,219 | 3/1969 | Bowman | 33/312 |
| 3,509,566 | 4/1970 | Vorie | 343/10 |
| 3,568,185 | 3/1971 | Page | 343/6 ND |
| 3,677,619 | 7/1972 | MacKenzie | 116/244 |
| 3,713,143 | 1/1973 | Blitz | 343/5 R |
| 3,746,842 | 7/1973 | Fowler | 364/457 |
| 3,750,164 | 7/1973 | Anderson | 343/5 R |
| 3,793,619 | 2/1974 | Regis | 343/11 R |
| 3,836,961 | 9/1974 | Ennis et al. | 343/5 CD |
| 3,882,502 | 5/1975 | Peabody et al. | 343/7.7 |
| 3,988,056 | 10/1976 | Hareng et al. | 343/6 ND |
| 4,023,018 | 5/1977 | Hall | 73/178 R |
| 4,047,168 | 9/1977 | Fowler | 33/363 R |
| 4,060,910 | 12/1977 | Gell, Jr. | 33/328 |
| 4,065,770 | 12/1977 | Berry | 343/5 SC |
| 4,069,481 | 1/1978 | Easy et al. | 343/5 EM |
| 4,077,037 | 2/1978 | Bryden | 343/5 EM |
| 4,092,644 | 5/1978 | Hodge | 343/5 W |
| 4,095,223 | 6/1978 | Howard | 343/17 |
| 4,099,179 | 7/1978 | Hofstein | 343/5 SC |
| 4,100,481 | 7/1978 | Gournay | 324/330 |
| 4,109,389 | 8/1978 | Balcom et al. | 33/363 K |
| 4,117,602 | 10/1978 | Lapeyre | 33/352 |
| 4,139,949 | 2/1979 | Goldman | 33/348 |
| 4,154,000 | 5/1979 | Kramer | 33/366 |
| 4,190,962 | 3/1980 | Lyman, Jr. | 33/348 |
| 4,205,313 | 5/1980 | Pease | 343/5 DP |
| 4,276,618 | 6/1981 | Green | 343/5 SC |
| 4,281,326 | 7/1981 | Anderson | 343/5 EM |
| 4,287,579 | 9/1981 | Inoue et al. | 340/554 |

FOREIGN PATENT DOCUMENTS 1586159 3/1981 United Kingdom .

OTHER PUBLICATIONS

"Radar in a 10-lb. Package", Radio Electronics, vol. 33, No. 7, Jul. (1962) p. 33.
"Portable Radar", Aviation Week, Nov. 12, 1962, p. 91.

Primary Examiner—Thomas H. Tarcza
Assistant Examiner—Gilberto Barrón, Jr.
Attorney, Agent, or Firm—Cushman, Darby & Cushman

[57] ABSTRACT

Apparatus is provided in conjunction with a small radar unit, for providing an improved display and additional radar target information. A ball type compass has an optical switching circuit for providing azimuth signals indicating the azimuth orientation of the radar unit. An inclinometer has an optical switching circuit for providing a target inclination signal from which, knowing target range, target altitude is calculated. A radar display in the form of an array of LCD or LED elements is provided.

6 Claims, 5 Drawing Figures

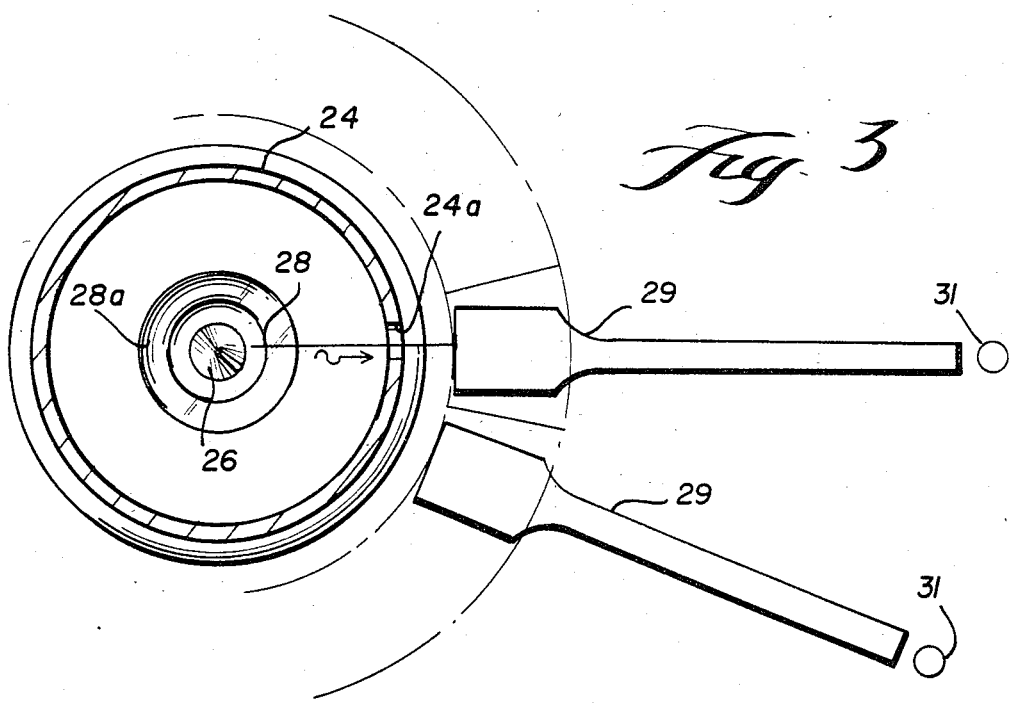
Fig. 3
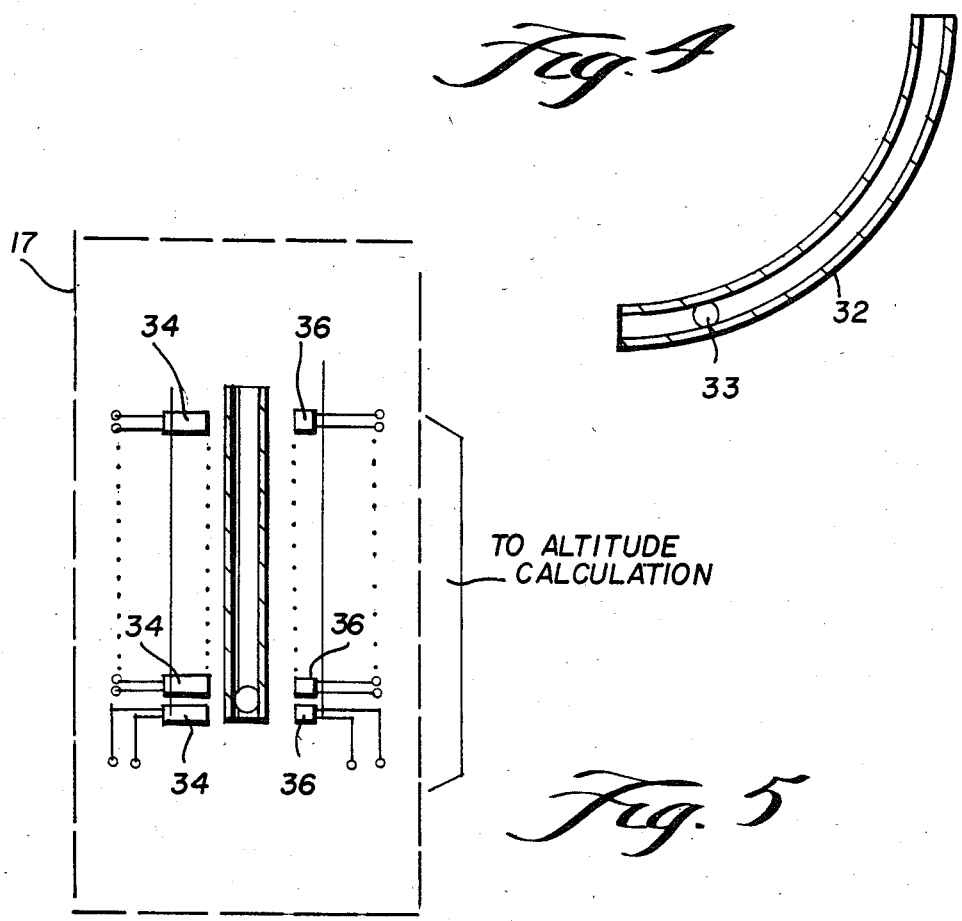
Fig. 4
Fig. 5

RADAR TRACKING SYSTEM AND DISPLAY

BACKGROUND OF THE INVENTION

This invention pertains to a radar tracking system and display, and in particular relates to such a system with a simplified display that, in addition to radar echo signals, displays plays additional information such as target azimuth and/or altitude.

There exists, of course, various designs of complex radar systems which provide a variety of information about radar targets. Typically, such radar systems are large and expensive, and are swept type systems and incorporate a complex display, such as a CRT display. In addition to such large and expensive prior art radar systems, there does exist small and relatively inexpensive radar units. One such unit is that sold under the name "Whistler Radar". Such a small radar unit is generally intended to be hand held, or at least manually swept. Target information in the "Whistler" radar is given in audio form. The operator dons earphones and scans the horizon in the direction of interest. When no target is detected by the radar beam, the Whistler radar unit is silent. A sharp whistle sound announces that a target is within range. Target range or distance to the target is determined by the pitch of the sound, and, for targets that are relatively close to the Whistler radar unit, a meter is provided on the unit and the meter pointer also serves as an indication of range.

A radar system such as the "Whistler" unit described above is useful but has limitations. For example, it requires a considerable amount of experience before an operator is able to translate the varying sounds of the unit to range or distance information. Furthermore, the "Whistler" unit only provides a real time target indication with respect to the direction in which it is pointed; it is therefore difficult to obtain an overall indication of e.g. the configuration of a shoreline or the like. Additionally, it would be difficult or impossible for an operator with a hearing impairment of any kind to operate the "Whistler" type radar unit.

While it is clear that small inexpensive radar units such as the "Whistler" radar unit have marine, law-enforcement and military applications, to mention a few, it is also clear that such units would have even more value if they provided additional information, and/or had a better arrangement for interpreting the radar echo information.

SUMMARY OF THE INVENTION

It is an object of this invention to provide a small inexpensive radar unit with means providing an improved indication of the range of a radar target.

It is another object of this invention to provide a small inexpensive radar unit with means for determining azimuth information for coordination with radar target echo information.

It is another object of this invention to provide a small inexpensive radar unit with the features set forth above, and which additionally incorporates a small efficient display means.

It is another object of this invention to provide for a small and inexpensive radar unit, a two dimensional display means for providing a visual display which includes a range indication corresponding to a sweep of the radar unit through an arc.

In accordance with one embodiment of the invention, a radar unit of the type which produces a radar echo signal indicating the presence of a target, with the radar signal varying in accordance with the range of the target, is utilized. Azimuth determination means are provided for mounting to the radar means for providing an azimuth signal indicative of the azimuth of the target. A two dimensional display means can be provided which has an array of selectively energizable elements disposed along two axes of the array, with one of the axes corresponding to azimuth and the other corresponding to range. The selectively energizable elements have two visually distinctive states. The radar signal and the azimuth signal are coupled to display control means, which energize selected of the selectively energizable elements as in indication of the presence of the target, with the selected elements being selected along one axis in accordance with range information and the radar signal and along another axis in accordance with the azimuth signal. If desired, inclinometer means can also be mounted to the radar means for providing an indication of the angular orientation of the radar means to a target. From the range and inclination of the target, the target elevation can be calculated and, if desired, displayed.

Other objects, features and advantages of the present invention will be perceived from a consideration of the accompanying detailed description of preferred embodiments taken in conjunction with the accompanying drawings.

BRIEF DESCRIPTION OF THE DRAWINGS

FIG. 3 is a diagrammatic top view of the arrangement of FIG. 2.

FIG. 4 is a side elevation of a portion of an inclinometer.

FIG. 5 is a front elevation of an inclinometer in accordance with one embodiment of the invention showing the curved tube of FIG. 4 and also showing the plurality of light sources and photo detecting elements.

DETAILED DESCRIPTION

Figure 1:
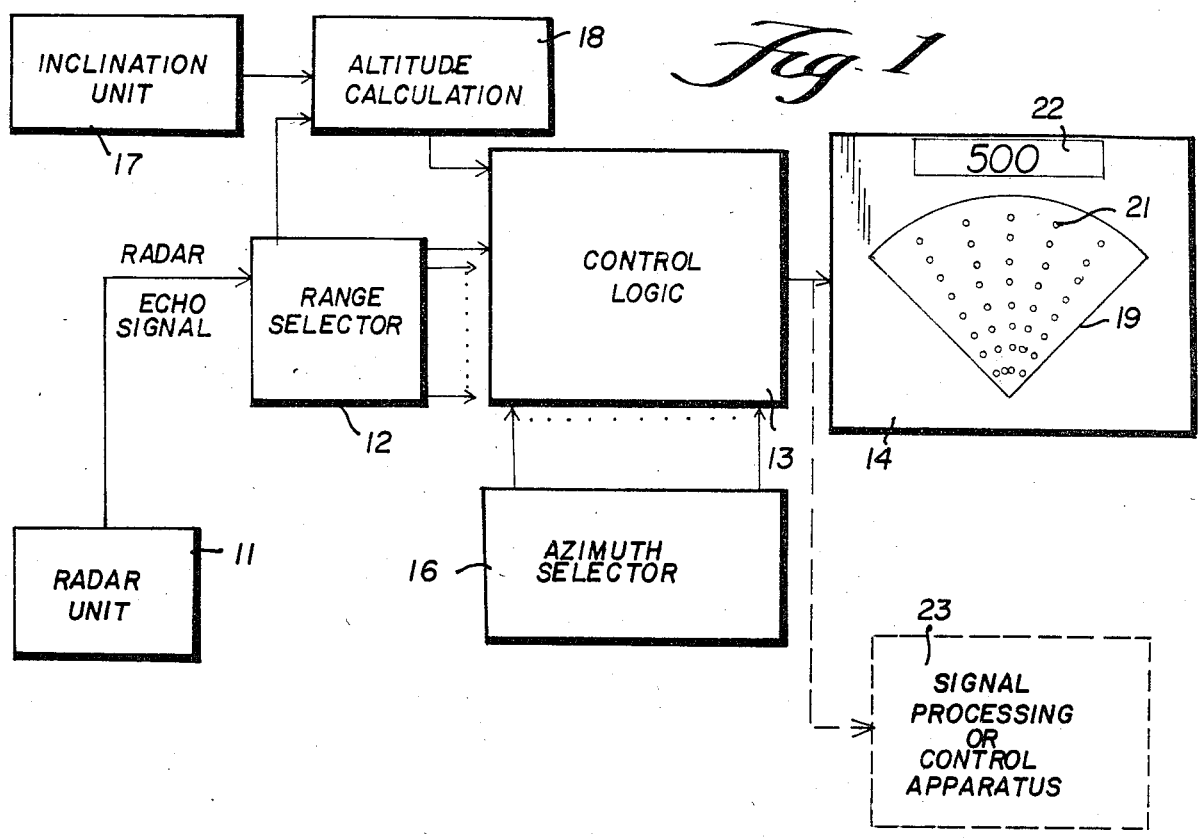
FIG. 1 is a block diagram of the overall system of the present invention.

Referring now to FIG. 1, there is shown a block diagram of the overall system of the present invention. A radar unit 11 is provided, which preferably is of the small, inexpensive type such as the "Whistler" radar unit. A radar target echo signal from the radar unit 11 is applied to a range selector 12; outputs of the range selector 12 are applied to control logic 13. The control logic 13, in the embodiment shown in FIG. 1, is utilized to drive a display 14. An azimuth selector 16 is also provided having a plurality of outputs feeding the control logic 13. The azimuth selector 16 is mounted in a suitable fashion to the radar unit 11, so as to provide at its outputs an indication of the azimuth orientation of the radar unit 11.

An inclination unit 17 is provided which is suitably mounted to the radar unit 11 and which functions to give an indication of the inclination of the radar unit 11. Signals from the inclination unit 17 are applied to an altitude calculation unit 18. The altitude calculation unit 18 also receives an input from the range selector 12, so that the altitude calculation unit 18 receives signals indicating the inclination of the radar unit and the range to a target. Using the range and inclination information, the altitude calculation unit 18 makes a simple calculation of the target elevation and, in accordance with one embodiment, applies the calculated altitude to the control logic 13, which is coupled to the display 14.

As mentioned previously, the "Whistler" radar unit has an output voltage which varies with target range (the meter pointer on the unit) and also has an audio output whose frequency varies in accordance with target range. Either of these outputs can be utilized, and appropriate circuitry in the range selector 12 and control logic 13 for driving the display 14 is easily provided by those skilled in this art.

In accordance with a preferred embodiment of the invention, the control logic 13 drives a display 14. In accordance with this one embodiment, the display 14 comprises a segment of a circle, generally indicated by reference numeral 19. As illustrated, diagrammatically in FIG. 1, the circular segment 19 includes a plurality of selectively energizable elements 21, each of which have two visually distinctive states. For example, the selectively energizable elements 21 can be light emitting diodes, or liquid crystal display segments. As shown in FIG. 1, the elements 21 are arranged in accordance with two axes on the circular segment 19, one of these axes being radii of the circular segment 19 and the other being in concentric circular segments. The elements 21 are arranged one at each intersection of a radius with the concentric circular segments. The number of selectively energizable elements provided in the display depends, of course, upon the resolution desired in the display. The display is unique and very advantageous in that it is flat, i.e. having a thickness of less than one inch, as contrasted to the considerably bulkier CRT type of display.

In operation, the azimuth selector 16 provides a plurality of discrete signals at its outputs, which are applied to the control logic 13 and from the control logic 13 to the display 14, in accordance with the azimuth orientation of the radar unit 11. Thus, for example, as the radar unit 11 is scanned from left to right, the discrete azimuth signals from the azimuth selector 16 sequentially select those of the selectively energizable elements 21 disposed along the successive radii in the circular segment 19 from left to right, respectively.

The range information in the radar target echo signal is extracted by the range selector 12 and control logic 13 and used to select which of the selectable energizable elements 21 along the successive radii of the segment 19 are selected to be energized for display. That is, distance along a radii of the circular segment 19 from the origin thereof is selected in accordance with the range information of the radar target echo signal. Suitable circuitry is provided in the control logic 13 so that the display shows either real-time or "frozen" data. That is, only one of the radial line of selectively energizable elements 21 can be enabled at a time in accordance with the outputs of the azimuth selector 16. Alternatively, target information can be continued to be displayed along the radial axes of the segment 19 during the scan, with additional target information being added along successive radii of the segment 19 as the radar unit is scanned. Such a "frozen" type of display will furnish a total picture of the scanned area, such as the contours of a shore line, for example.

In accordance with one embodiment of the invention, the display 14, in addition to displaying range and target information on the circular segment 19, also contains a display of the target altitude. This can be provided in the form of a plurality of alpha numeric digits suitably constructed from light emitting diode or liquid crystal display segments and provided, for example, in a window 22.

If desired, the output of the control logic 13, which contains target echo, target range, and target altitude information can be used for purposes other than simply driving a display. Thus, there is illustrated in dashed lines in FIG. 1 where the output of the control logic 13 is applied to other signal processing or control apparatus 23. For example, as regards military operations, the Redeye Missile System is a manually-portable and visually aimed surface-to-air missile, which is used for infantry defense against enemy tactical support aircraft. One shortcoming of such missile system is its lack of usage in inclement weather. Using a system such as provided in this invention, the range and altitude of an enemy tactical support aircraft could be determined, and utilized by suitable signal processing or control apparatus 23 to provide aiming information for manually aiming a Redeye Missile Launcher. The invention is also applicable and can be used in other similar military and law enforcement applications where small and inexpensive radar target detection arrangements are desired.

Figure 2:
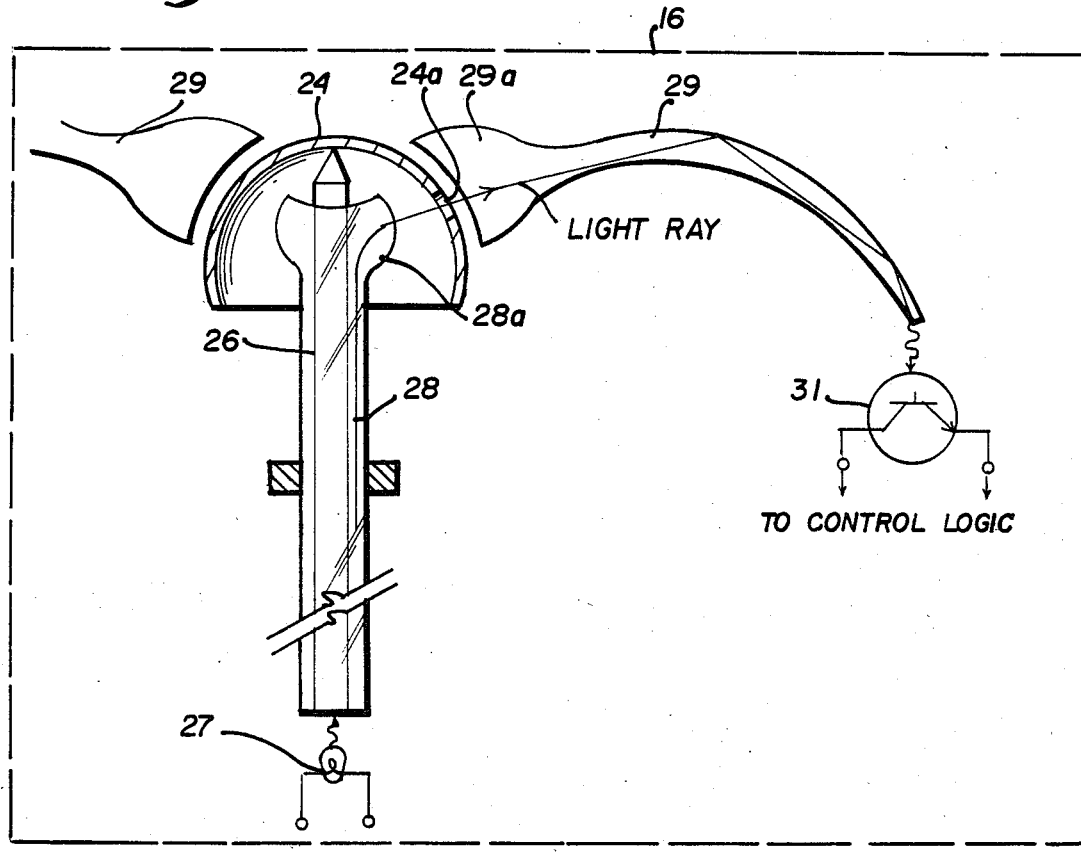
FIG. 2 is a cross sectional side elevation of a ball-type compass arrangement for generating an azimuth signal corresponding to the orientation of the radar unit.

Turning now to FIG. 2, there is shown a portion of the side elevational view in cross section of the azimuth selector 16. The heart of the azimuth selector 16 is a ball type magnetic compass having a compass rose 24 suitably arranged on a pivot 26. The compass rose 24 is opaque except for one small opening indicated by reference numeral 24a in the circumference of the compass rose. An external light bulb 27 is provided and physically situated far enough from the magnetic structure of the ball type compass as not to affect same. Light from the external light bulb 27 is funneled into the ball type compass through fiber optic strands 28; the ends of the fiber optic strands 28 are oriented radially inside the compass rose 24 and serve as the light source inside the compass rose or ball. As illustrated in FIG. 2, the ends of the fiber optic strands may expand and be curved inside the compass ball so that their ends are actually thick lenses as illustrated by reference numeral 28a.

Surrounding the outside of the compass ball 24 and arranged radially around the outside of the compass ball are a plurality of optical fibers 29 functioning as detectors as illustrated in FIG. 2; the inside ends of the fibers 27 may be flared as illustrated by reference numeral 29a to enhance their ability to capture light. Adjacent the opposite ends 29b of each of the optical fibers 29 there is disposed a suitable photo detector, such as a phototransistor 31. The output of each of the photo transistors 31 constitutes an output of the azimuth selector 16 to the control logic 13. As diagrammatically illustrated in FIG. 3, the entire circumference of the compass ball 24 is surrounded by a plurality of these optical fibers 29, each having at its remote end a photo detector 31.

In operation, light from the source fibers 28 within the compass structure is blocked by the compass ball 24 with one exception. The light passing from the source fibers through the hole 24a in the ball completes an optical circuit through whichever one of the optical fibers 29 is adjacent the hole or opening 24a, to actuate the photo detector 31 associated with that particular optical fiber 29. Thus, as the azimuth selector 16, which it will be recalled is attached to the radar unit 11, is rotated through a scan, the compass ball 24 will rotate so that light is passed through the opening 24a to a succession of the optical fibers 29 to thereby illuminate a succession of the photo detectors 31.

As mentioned previously, in accordance with on embodiment of the invention, means are provided to determine the inclination of the radar unit 11, and from the inclination and range information the altitude of a target can be calculated. FIGS. 4 and 5 illustrate the features of an inclinometer that can be provided in accordance with this one embodiment of the invention. FIG. 4 illustrates a side illustration of an inclinometer tube 32 having a small ball 33 therein the inclinometer tube 32 is filled with a damping fluid such as oil, and the small ball 33 inside seeks the lowest point where it is dynamically stable along the curved tube 32. Thus, the position of the ball 33 in the tube 32 is an indication of the inclination of the inclinometer. As illustrated in FIG. 5, along one side of the curved tube 32 there is disposed a plurality of individual light sources 34. On the opposite side of the inclinometer tube 32, there is disposed a corresponding and aligned group of photo detectors 36. The position of the ball 33 inside the curved tube 32 blocks the light from one of the light sources 34 from reaching its associated photo detector 36. Thus, the outputs of the photo detectors 36 furnish an indication of the position of the ball 33 in the curved tube 32, which is an indication of the inclination of the radar unit 11.

While FIGS. 4 and 5 show an inclinometer adapted for use through an inclination angle of approximately 90°, it clearly is within the scope of this invention to provide a similar inclinometer construction adapted to sense inclination over a larger range, even up to 360°.

As mentioned previously, the outputs of the inclination unit 17 are applied to a suitable altitude calculation circuit 18, along with the range information from the radar target echo signal. A simple micro processor can be provided to make the altitude calculations from the inclination and range information, and supply the altitude calculation to control logic 13.

It is contemplated that the present invention can be provided including a radar unit 11, with the azimuth selector 16 and inclination unit 17 physically attached thereto to provide azimuth and inclination information with respect to the radar unit. Alternatively, the present invention can be provided as an accessory for use with existing "Whistler" and other similar small inexpensive radar units. Moreover, while the present invention has been described with reference to various specific preferred embodiments, it should be clear to those skilled in the art that various modifications can be made to the specific embodiments disclosed herein without departing from the true spirit and scope of the invention. It is intended to define the scope of the invention in the appended claims.

I claim:

1. Apparatus for use in conjunction with a hand-held radar unit of the type producing a radar echo signal indicating the presence of a target when manually scanned, which radar signal varies in accordance with the range of the target, comprising azimuth determination means mounted to the radar unit for providing an azimuth signal indicative of the aximuth orientation of the radar unit as the radar unit is manually scanned, a display means comprising a two-dimensional array of selectively energizable elements disposed along two axes of said array and having two visually distinctives states, one of said axes representing azimuth and the other representing range; said radar signal and said azimuth signal coupled to said display means, means for energizing selected of said selectively energizable elements as an indication of the presence of a target during manual scanning of said radar unit, with the selected elements being selected along one axis in accordance with range information in the radar signal and along another axis in accordance with said azimuth signal, and wherein said azimuth determination means comprises a ball type compass having a compass rose opaque except for one small light-transmitting window; a source of light within the interior of said compass rose; a plurality of light-sensing means positioned adjacent the periphery of said compass rose, such that a selected one of said light-sensing means illuminated by light through said one small light-transmitting window, and means for generating an azimuth signal indicating which of said light-sensing means is illuminated as an indication of the azimuth orientation of said radar unit.

2. Apparatus in accordance with claim 1 wherein said light sensing means comprises a plurality of optical fibers and associated Photo-detecting elements, said optical fibers extending from the periphery of the compass rose to adjacent said respective photo-detecting elements, with outputs of said photo-detecting elements controlling displays along the azimuth axis of said two-dimensional display.

3. Apparatus for use in conjuction with a hand-held radar unit of the type producing a radar echo signal indicating the presence of a target when manually scanned, which radar signal varies in accordance with the range of the target, comprising azimuth determination means mounted to the radar unit for providing an azimuth signal indicative of the azimuth orientation of the radar unit as the radar unit is manually scanned, a display means comprising a two-dimensional array of selectively energizable elements disposed along two axes of said array and having two visually distinctive states, one of said axes representing azimuth and the other representing range; said radar signal and said azimuth signal coupled to said display means, means for energizing selected of said selectively energizable elements as an indication of the presence of a target during manual scanning of said radar unit, with the selected elements being selected along one axis in accordance with range information in the radar signal and along another axis in accordance with said azimuth signal; inclinometer means mounted to said radar unit for providing an indication of the angular orientation of said radar to a target during manual scanning, means for calculating target elevation in accordance with said angular orientation indication and the range information in said radar signal, and means for displaying the target elevation, and wherein said inclinometer means comprises a curved tube containing a damping fluid with an opaque ball suspended therein; a plurality of light sources mounted adjacent one side of said curved tube and a corresponding plurality of light-sensing elements mounted adjacent the opposite side of said curved tube, whereby the particular position of said ball in said curved tube, which represents a particular inclination of said radar unit, serves to selectively block passage of light from a particular light source to its associated light-sensing element, thereby providing a signal representing inclination of said radar unit.

4. Apparatus in accordance with claim 3 wherein said means for calculating target elevation receives said signal representing inclination of said radar means and also said radar signal which varies in accordance with target range, and calculates target elevation therefrom.

5. Apparatus for use in conjunction with a radar unit of the type producing a radar echo signal indicating the presence of a target, which radar signal varies in accordance with the range of a target, comprising azimuth determination means for mounting to the radar unit for providing an azimuth signal indicative of the azimuth orientation of the radar unit, inclinometer means for mounting to the radar unit for providing an indication of the angular orientation of the radar unit to a target, calculation means for calculating target elevation in accordance with said angular orientation indication and the range information in said radar signal and providing a target elevation signal, whereby the azimuth signal, target elevation signal and range information in the echo signal provide an indication of the location of the radar target, and wherein said azimuth determination means comprises a compass including a plurality of optical switches which are switched in accordance with azimuth orientation of said compass.

6. Apparatus for use in conjunction with a radar unit of the type producing a radar echo signal indicating the presence of a target, which radar signal varies in accordance with the range of a target, comprising azimuth determination means for mounting to the radar unit for providing an azimuth signal indicative of the azimuth orientation of the radar unit, inclinometer means for mounting to the radar unit providing an indication of the angular orientation of the radar unit to a target, calculation means for calculating target elevation in accordance with said angular orientation indication and the range information in said radar signal and providing a target elevation signal, whereby the azimuth signal, target elevation signal and range information in the echo signal provide an indication of the location of the radar target, and wherein said inclinometer means comprises a curved tube and ball inclinometer and includes a plurality of optical switches which are switched in accordance with the position of the ball in the curved tube.

* * * * *